(12) United States Patent
Al-Shammari et al.

(10) Patent No.: US 12,234,415 B2
(45) Date of Patent: Feb. 25, 2025

(54) NAPHTHA CATALYTIC CRACKING PROCESS

(71) Applicant: SABIC GLOBAL TECHNOLOGIES B.V., Bergen op Zoom (NL)

(72) Inventors: Talal Khaled Al-Shammari, Riyadh (SA); Mamilla Sekhar Babu, Geleen (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 41 days.

(21) Appl. No.: 17/630,026

(22) PCT Filed: Jul. 14, 2020

(86) PCT No.: PCT/IB2020/056607
§ 371 (c)(1),
(2) Date: Jan. 25, 2022

(87) PCT Pub. No.: WO2021/019343
PCT Pub. Date: Feb. 4, 2021

(65) Prior Publication Data
US 2023/0048953 A1    Feb. 16, 2023

Related U.S. Application Data

(60) Provisional application No. 62/881,210, filed on Jul. 31, 2019.

(51) Int. Cl.
| | | |
|---|---|---|
| *C10G 9/00* | (2006.01) | |
| *B01D 3/14* | (2006.01) | |
| *C10G 11/00* | (2006.01) | |
| *C10G 55/00* | (2006.01) | |
| *C10G 69/04* | (2006.01) | |
| *C10G 69/06* | (2006.01) | |

(52) U.S. Cl.
CPC ............... *C10G 55/00* (2013.01); *B01D 3/14* (2013.01); *C10G 2300/1044* (2013.01); *C10G 2300/4081* (2013.01); *C10G 2400/20* (2013.01); *C10G 2400/22* (2013.01); *C10G 2400/28* (2013.01); *C10G 2400/30* (2013.01)

(58) Field of Classification Search
CPC .......... C10G 9/00; C10G 11/00; C10G 69/04; C10G 69/06; C10G 2300/4081; C10G 2400/20; C10G 2400/22; C10G 2400/30
See application file for complete search history.

(56) References Cited

U.S. PATENT DOCUMENTS

| | | | | |
|---|---|---|---|---|
| 5,523,502 | A * | 6/1996 | Rubin ................... | C10G 69/06 585/314 |
| 2009/0288985 | A1 | 11/2009 | Long et al. | |
| 2010/0145120 | A1 * | 6/2010 | Bouvart .................... | C07C 7/04 585/324 |
| 2013/0248419 | A1 | 9/2013 | Abba et al. | |
| 2013/0267745 | A1 | 10/2013 | Schrod et al. | |
| 2018/0057758 | A1 | 3/2018 | Al-Ghamdi et al. | |
| 2021/0222073 | A1 * | 7/2021 | Al-Shammari ........ | C10G 11/05 |
| 2021/0292660 | A1 * | 9/2021 | Al-Shammari .......... | B01D 3/14 |

FOREIGN PATENT DOCUMENTS

| | | |
|---|---|---|
| CN | 102795958 A | 11/2012 |
| CN | 105339470 A | 2/2016 |
| CN | 105349179 A | 2/2016 |
| CN | 105349179 B | 4/2017 |
| EP | 2828361 A1 | 1/2015 |
| WO | WO2015000842 A1 | 1/2015 |
| WO | WO2016098909 A1 | 6/2016 |
| WO | WO2016192041 A1 | 12/2016 |

OTHER PUBLICATIONS

Renqing Liu et al. "Chemical World." Guangxi Science and Technology Publishing House, 1st edition, Mar. 2000, pp. 76-77, English Translation.
Zuozheng Li et al. "Production and Management of Ethylene." China Petrochemical Press, 1st edition, Aug. 1992, pp. 488-489, English Translation.
International Search Report and Written Opinion from PCT/IB2020/056607 dated Oct. 5, 2020, 10 pages.
*Proceedings of the 17th World Petroleum Congress*, edited by the Chinese National Committee of the World Petroleum Congress, pp. 476-477, China Petrochemical Press, Dec. 2004. English Translation.
*Petrochemical Industry Technology and Economy*, edited by Hua Lin, pp. 100-101, China Petrochemical Press, Dec. 1990. English Translation.
*Energy Dictionary*, edited by Yajie Zhu, p. 134, China Petrochemical Press, Dec. 1992. English Translation.

\* cited by examiner

*Primary Examiner* — Randy Boyer
(74) *Attorney, Agent, or Firm* — Norton Rose Fulbright US LLP (57) ABSTRACT

Systems and methods for producing light olefins and BTX (benzene, toluene, and xylene). Crude oil is first separated to produce light naphtha and heavy naphtha. Light naphtha is fed to a steam cracking unit and heavy naphtha is fed to a catalytic cracking unit. The effluent from the steam cracking unit and the effluent from the catalytic cracking unit are flowed into an oil quench tower and are further separated in a separation unit to produce an ethylene stream, a propylene stream, and a BTX stream. The $C_4$ hydrocarbons, ethane, and propane from the effluent of the steam cracking unit and the effluent from the catalytic cracking unit are recycled to the steam cracking unit. The non-BTX $C_6+$ hydrocarbons from the effluent of the steam cracking unit and the effluent from the catalytic cracking unit are recycled to the catalytic cracking unit.

20 Claims, 2 Drawing Sheets

FIG. 1

NAPHTHA CATALYTIC CRACKING PROCESS

CROSS REFERENCE TO RELATED APPLICATIONS

This application is a national phase application under 35 U.S.C. § 371 of International Application No. PCT/IB2020/056607 filed Jul. 14, 2020, which claims priority to U.S. Provisional Patent Application No. 62/881,210 filed Jul. 31, 2019. The entire contents of each of the above-referenced disclosures is specifically incorporated by reference herein without disclaimer.

FIELD OF INVENTION

The present invention generally relates to a process for producing light olefins and BTX (benzene, toluene, and xylene). More specifically, the present invention relates to a process that integrates heavy naphtha catalytic cracking and steam cracking to produce light olefins and BTX.

BACKGROUND OF THE INVENTION

Light olefins ($C_2$ to $C_3$ olefins) are building blocks for many chemical processes. Light olefins are used to produce polyethylene, polypropylene, ethylene oxide, ethylene chloride, propylene oxide, and acrylic acid, which, in turn, are used in a wide variety of industries such as the plastic processing, construction, textile, and automotive industries. Generally, light olefins are produced by steam cracking naphtha. However, in this process, a large portion of effluent from steam cracking naphtha is hydrogenated and recycled back to the steam cracking unit, resulting in high energy consumption for producing light olefins.

BTX (benzene, toluene, and xylene) are a group aromatics that are used in many different sectors of the chemical industry, especially the plastic and polymer sectors. For instance, benzene is a precursor for producing polystyrene, phenolic resins, polycarbonate, and nylon. Toluene is used for producing polyurethane and as a gasoline component. Xylene is feedstock for producing polyester fibers and phthalic anhydride. In the petrochemical industry, benzene, toluene, and xylene are conventionally produced by catalytic reforming of naphtha.

Over the last few decades, the demand for both light olefins and BTX has been consistently increasing. Catalytic cracking of naphtha has become one of the commonly used methods for producing both light olefins and BTX. However, the overall efficiency for catalytic cracking of naphtha is relatively low because catalytic cracking of light portion of naphtha, which comprises primarily hydrocarbons having a boiling point of 30 to 90° C., generally requires severe reaction conditions (e.g., high temperatures) to achieve target yield of light olefins and BTX. Thus, the energy consumption for producing light olefins and BTX via catalytic cracking is relatively high, resulting in high production costs for light olefins and BTX via catalytic cracking naphtha.

Overall, while methods of producing light olefins and BTX exist, the need for improvements in this field persists in light of at least the aforementioned drawbacks for the methods.

BRIEF SUMMARY OF THE INVENTION

A solution to at least some of the above-mentioned problems associated with the production process for light olefins and BTX has been discovered. The solution resides in a method of producing light olefins and BTX that includes separating a crude oil feed stream to produce a light naphtha stream and a heavy naphtha stream. The light naphtha stream is fed to a steam cracking unit and the heavy naphtha is fed to a heavy naphtha catalytic cracking unit. The effluent from both of the steam cracking unit and the heavy naphtha catalytic cracking unit are processed in the same separation units. Separated $C_5$+ hydrocarbons are recycled to the heavy naphtha catalytic cracking unit and separated light paraffins ($C_2$-$C_5$ paraffins) are recycled to the steam cracking unit. This can be beneficial for at least reducing energy consumption in the production of light olefins and BTX by removing light naphtha from the feedstock of the catalytic cracking process and removing heavy naphtha fraction from the feedstock of steam cracking process. Notably, this method integrates the steam cracking unit and the catalytic cracking unit to optimize energy consumption and light olefins and BTX yield. More specifically, the steam cracking unit and the catalytic cracking unit use the same separation unit to separate and purify produced light olefins and BTX, further reducing the operating cost and capital expenditure for light olefins and BTX production. Furthermore, the process heat from both the catalytic cracking unit and the steam cracking unit can be recovered to provide heat to the steam cracking unit or the pre-heater for the catalytic cracking unit, thereby further reducing energy consumption for producing light olefins and BTX. Therefore, the method of the present invention provides a technical solution to at least some of the problems associated with the currently available methods for producing light olefins mentioned above.

Embodiments of the invention include a method of producing olefins and aromatics. The method comprises separating crude oil to produce a light naphtha stream that has an initial boiling point in a range of 20 to 35° C. and a final boiling point in a range of 85 to 95° C., and a heavy naphtha stream that has an initial boiling point in a range of 85 to 95° C. and a final boiling point in a range of 200 to 250° C. The method further comprises, in a steam cracking unit, subjecting the light naphtha stream to steam cracking conditions sufficient to convert hydrocarbons in the light naphtha stream and produce a first effluent stream comprising one or more of ethylene, propylene, butene, benzene, toluene, and xylene. The method further comprises, in a catalytic cracking unit, contacting the heavy naphtha stream with a catalyst under catalytic cracking conditions sufficient to cause cracking of hydrocarbons in the heavy naphtha stream to form a second effluent stream. The method further comprises separating the first effluent stream and the second effluent stream to produce a light intermediate stream comprising primarily $C_2$ to $C_4$ hydrocarbons, and a heavy intermediate stream comprising primarily $C_5$ to $C_{12}$ hydrocarbons. The method further still comprises cracking the light intermediate stream in the steam cracking unit. The method further still comprises cracking the heavy intermediate stream in the catalytic cracking unit.

Embodiments of the invention include a method of producing olefins and aromatics. The method comprises separating crude oil in a distillation column to produce a light naphtha stream that has an initial boiling point in a range of 20 to 35° C. and a final boiling point in a range of 85 to 95° C., and a heavy naphtha stream that has an initial boiling point in a range of 85 to 95° C. and a final boiling point in a range of 200 to 250° C. The method further comprises, in a steam cracking unit, subjecting the light naphtha stream to steam cracking conditions sufficient to convert hydrocarbons in the light naphtha stream and produce a first effluent stream comprising one or more of ethylene, propylene, butene, benzene, toluene, xylene, and other $C_2$ to $C_{12}$ hydrocarbons. The method further comprises, in a catalytic cracking unit, contacting the heavy naphtha stream with a catalyst under catalytic cracking conditions sufficient to cause cracking of hydrocarbons in the heavy naphtha stream to form a second effluent stream. The method further comprises separating the first effluent stream and the second effluent stream to produce a light intermediate stream comprising primarily ethane, propane, and $C_4$ hydrocarbons, collectively, a heavy intermediate stream comprising primarily $C_5$ to $C_{12}$ hydrocarbons, an ethylene stream comprising primarily ethylene, a propylene stream comprising primarily propylene, and a BTX stream comprising primarily benzene, toluene, xylene, collectively. The method further still comprises cracking the light intermediate stream in the steam cracking unit. The method further still comprises cracking the heavy intermediate stream in the catalytic cracking unit.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The term "raffinate," as the term is used in the specification and/or claims, means the rest of a product stream, from which a target component or components have been removed.

The use of the words "a" or "an" when used in conjunction with the term "comprising," "including," "containing," or "having" in the claims or the specification may mean "one," but it is also consistent with the meaning of "one or more," "at least one," and "one or more than one."

The term "$C_{n+}$ hydrocarbon" wherein n is a positive integer, e.g. 1, 2, 3, 4, or 5, as that term is used in the specification and/or claims, means any hydrocarbon having at least n number of carbon atom(s) per molecule.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Currently, light olefins and BTX can be produced by catalytic cracking of naphtha. However, the overall yield for the target products is relatively low because catalytic cracking of the light portion of naphtha consumes a large amount of energy. Light olefins and BTX can also be produced by steam cracking naphtha. However, the overall conversion rate to light olefins and BTX for steam cracking naphtha is relatively low, resulting in large amounts of recycle stream back to the steam cracking unit and, consequently, high production cost. The present invention provides a solution to at least some of these problems. The solution is premised on a method including splitting crude oil to produce a light naphtha stream and a heavy naphtha stream, and feeding the light naphtha stream to a steam cracking unit and the heavy naphtha stream to a catalytic cracking unit. The effluents from the catalytic cracking unit and the steam cracking unit are separated to produce a heavy recycle stream and a light recycle stream. The heavy recycle stream is further flowed to the catalytic cracking unit, and the light recycle stream is further flowed to the steam cracking unit. Therefore, the method is capable of reducing energy consumption for catalytic cracking by utilizing only heavy naphtha as the catalytic cracking feedstock and improving conversion rate and reducing energy consumption for steam cracking by utilizing only light naphtha as the steam cracking feedstock. Additionally, this method utilizes the same production separation system for the catalytic cracking unit and the steam cracking unit, resulting in reduced production cost and capital expenditure compared to conventional independent processes of steam cracking and catalytic cracking for light olefins and BTX production. Furthermore, this method includes recovering process heat from the catalytic cracking unit and the steam cracking unit to produce superheated steam, which can be used to pre-heat feed streams or provide heat to the steam cracking unit, thereby reducing energy consumption compared to the conventional methods. These and other non-limiting aspects of the present invention are discussed in further detail in the following sections.

A. System for Producing Olefins and BTX

Figure 1:
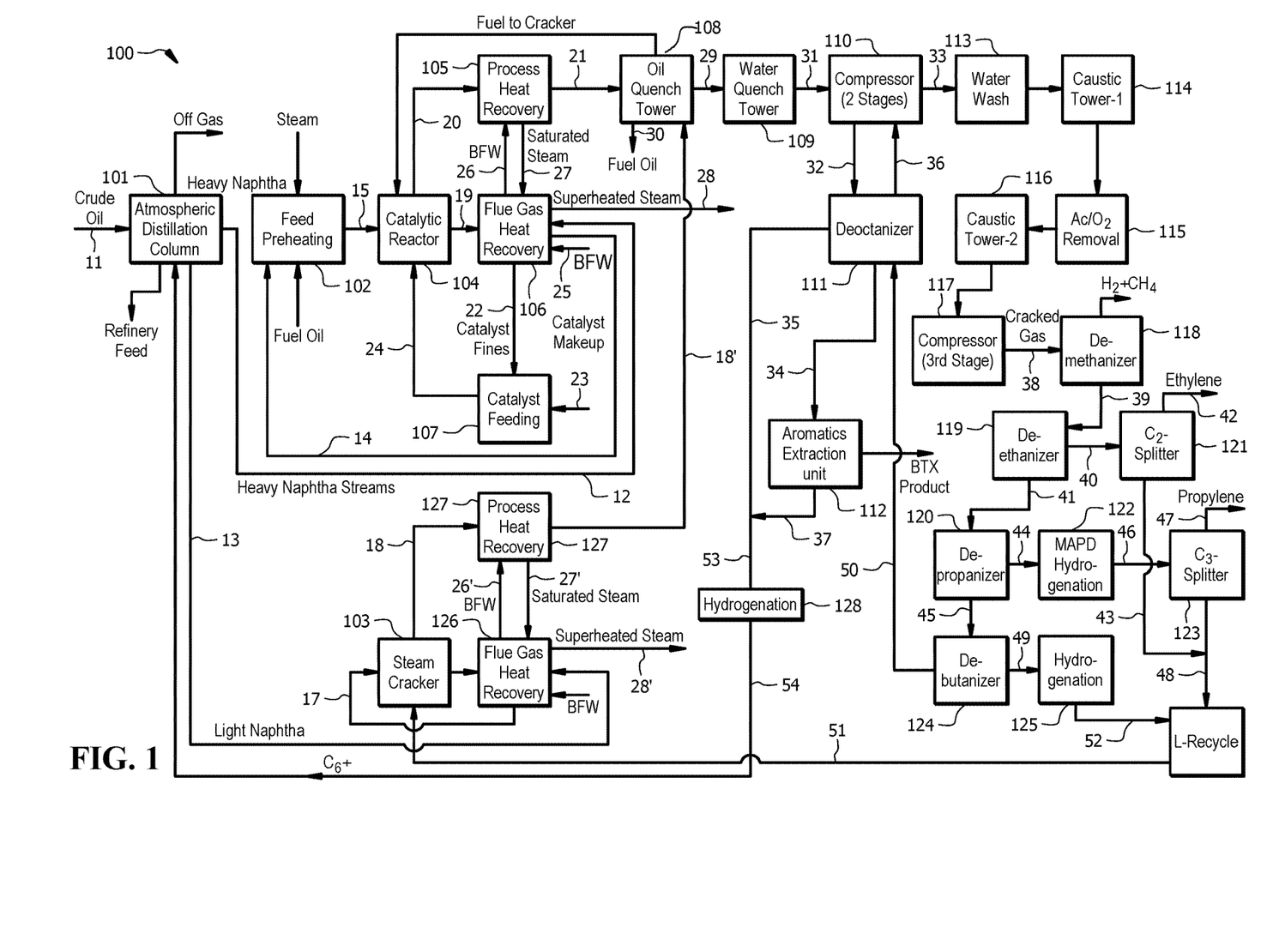
FIG. 1 shows a schematic diagram of a system for producing light olefins and BTX, according to embodiments of the invention.

In embodiments of the invention, the system for producing light olefins and BTX can include an integrated system comprising a distillation column, a catalytic cracking unit, a steam cracking unit, and a product separation unit. With reference to FIG. 1, a schematic diagram is shown of system 100 that is capable of producing light olefins (e.g., $C_2$ and $C_3$ olefins) and BTX (benzene, toluene, xylene) with improved production efficiency and reduced production cost compared to conventional processes. According to embodiments of the invention, system 100 includes distillation unit 101 configured to receive and separate crude oil stream 11 to produce first stream 12 and second stream 13. Distillation unit 101 may be an atmospheric distillation column. In embodiments of the invention, first stream 12 is a heavy naphtha stream that comprises primarily heavy naphtha. Heavy naphtha may have an initial boiling point of 85 to 95° C. and a final boiling point of 200 to 250° C. In embodiments of the invention, second stream 13 is a light naphtha stream that comprises primarily light naphtha. Light naphtha may have an initial boiling point of 25 to 35° C. and a final boiling point of 85 to 95° C.

According to embodiments of the invention, a first outlet of distillation unit 101 is in fluid communication with an inlet of catalyst regeneration unit 106 such that first stream 12 comprising primarily heavy naphtha flows from distillation unit 101 to catalyst regenerating unit 106. Catalyst regeneration unit 106 may be configured to pre-heat first stream 12 to produce first preheated first stream 14. In embodiments of the invention, an outlet of catalyst regeneration unit 106 may be in fluid communication with an inlet of feed preheating unit 102 such that first preheated first stream 14 flows from distillation unit 101 to feed preheating unit 102. In embodiments of the invention, feed preheating unit 102 is adapted to preheat first preheated first stream 14 to a temperature of 100 to 250° C. and all ranges and values there between. Feed preheating unit 102 may be further adapted to mix steam with first preheated first stream 14 to produce catalytic cracking feed stream 15. In embodiments of the invention, catalytic cracking feed stream 15 has a steam to hydrocarbon weight ratio of 0.5 to 1 and all ranges and values there between including ranges of 0.5 to 0.6, 0.6 to 0.7, 0.7 to 0.8, 0.8 to 0.9, and 0.9 to 1.0. In embodiments of the invention, catalytic cracking feed stream 15 has an initial boiling point of 85 to 95° C. and a final boiling point of 200 to 250° C. According to embodiments of the invention, feed preheating unit 102 comprises a heat exchanger configured to heat first stream 12.

In embodiments of the invention, a second outlet of distillation unit 101 is in fluid communication with second flue gas heat recovery unit 126 such that second stream 13 flows from distillation unit 101 to second flue gas heat recovery unit 126. According to embodiments of the invention, second flue gas heat recovery unit 126 is adapted to heat second stream 13 to form steam cracking unit feed stream 17. In embodiments of the invention, an outlet of second flue gas heat recovery unit 126 is in fluid communication with steam cracking unit 103 such that steam cracking unit feed stream 17 flows from second flue gas heat recovery unit 126 to steam cracking unit 103. In embodiments of the invention, steam cracking unit 103 is configured to steam crack hydrocarbons of steam cracking feed stream 17 under reaction conditions sufficient to produce second intermediate product stream 18. Second intermediate product stream 18 may comprise ethylene, propylene, $C_4$ hydrocarbons, BTX, hydrogen, methane, ethane, propane, butadiene, $C_5+$ hydrocarbons, $C_6+$ hydrocarbons, or combinations thereof. According to embodiments of the invention, steam cracking unit 103 is further configured to produce flue gas, which is used to provide heat in second flue gas heat recovery unit 126.

In embodiments of the invention, an outlet of steam cracking unit 103 is in fluid communication with an inlet of second process heat recovery unit 127 such that second intermediate product stream 18 flows from steam cracking unit 103 to second process heat recovery unit 127. Second process heat recovery unit 127 may be configured to cool second intermediate product stream 18 with boiler feed water stream 26' to produce cooled second intermediate product stream 18'. According to embodiments of the invention, second process heat recovery unit 127 is further configured to heat boiler feed water stream 26' to produce steam stream 27'. Second flue gas heat recovery unit 126 may be further configured to heat steam stream 27' to produce superheated steam 28'. Superheated steam 28' may be used in steam cracking unit 103 for providing heat to furnaces thereof.

According to embodiments of the invention, an outlet of feed preheating unit 102 is in fluid communication with catalytic cracking unit 104 such that catalytic cracking feed stream 15 flows from feed preheating unit 102 to catalytic cracking unit 104. In embodiments of the invention, catalytic cracking unit 104 is adapted to crack hydrocarbons of catalytic cracking feed stream 15 in presence of a catalyst under reaction conditions sufficient to produce first intermediate product stream 20. In embodiments of the invention, first intermediate product stream 20 comprises primarily methane, hydrogen, ethane, propane, ethylene, propylene, $C_4$ hydrocarbons, BTX, $C_5$ to $C_{14}$ hydrocarbons, or combinations thereof. In embodiments of the invention, catalytic cracking unit 104 comprises one or more fluidized bed reactors, one or more fixed bed reactors, or combinations thereof. In embodiments of the invention, catalytic cracking unit 104 may contain a catalyst comprising alumina, silica, zeolite, or combinations thereof.

In embodiments of the invention, a first outlet of catalytic cracking unit 104 is in fluid communication with catalyst regeneration unit 106 such that spent catalyst of stream 19 from catalytic cracking unit 104 flows to catalyst regeneration unit 106. In embodiments of the invention, catalyst regenerating unit 106 is adapted to regenerate spent catalyst from catalytic cracking unit 104 to produce regenerated catalyst stream 22 and flue gas. According to embodiments of the invention, catalyst regenerating unit 106 is further adapted to heat boiler feed water stream 25 using flue gas heat to produce heated boiler feed water stream 26. In embodiments of the invention, catalyst regeneration unit 106 includes one or more heaters, one or more mixers, one or more regeneration reactors, or combinations thereof.

An outlet of catalyst regeneration 106 may be in fluid communication with catalyst feeding unit 107 such that regenerated catalyst stream 22 flows from catalyst regeneration unit 106 to catalyst feeding unit 107. In embodiments of the invention, catalyst feeding unit 107 is configured to combine regenerated catalyst stream 22 with catalyst makeup stream 23 comprising fresh catalyst to form catalyst feed stream 24, which is flowed to catalytic cracking unit 104.

In embodiments of the invention, a second outlet of catalytic cracking unit 104 is in fluid communication with first process heat recovery unit 105 such that first intermediate product stream 20 flows from catalytic cracking unit 104 to first process heat recovery unit 105. First process heat recovery unit 105 may be configured to cool first intermediate product stream 20 using heated boiler feed water stream 26 to produce steam stream 27 and cooled first intermediate product stream 21. In embodiments of the invention, an outlet of first process heat recovery unit 105 is in fluid communication to catalyst regeneration unit 106 such that steam stream 27 flows to catalyst regeneration unit 106. In embodiments of the invention, steam stream 27 is heated to produce superheated steam 28. In embodiments of the invention, superheated steam 28 is at a temperature of 500 to 600° C. and all ranges and values there between including ranges of 500 to 510° C., 510 to 520° C., 520 to 530° C., 530 to 540° C., 540 to 550° C., 550 to 560° C., 560 to 570° C., 570 to 580° C., 580 to 590° C., and 590 to 600° C. In embodiments of the invention, first process heat recovery unit 105 includes one or more heat exchangers.

In embodiments of the invention, an outlet of first process heat recovery unit 105 is in fluid communication with oil quench tower 108 such that cooled first intermediate product stream 21 flows from first process heat recovery unit 105 to oil quench tower 108. According to embodiments of the invention, an outlet of second process heat recovery unit 127 is in fluid communication with oil quench tower 108 such that cooled second intermediate product stream 18' flows from second process heat recovery unit 127 to oil quench tower 108. In embodiments of the invention, oil quench tower 108 is adapted to cool cooled first intermediate product stream 21 and cooled second intermediate product stream 18' to a temperature in a range of 95 to 105° C. and all ranges and values there between including ranges of 95 to 96° C., 96 to 97° C., 97 to 98° C., 98 to 99° C., 99 to 100° C., 100 to 101° C., 101 to 102° C., 102 to 103° C., 103 to 104° C., and 104 to 105° C.

According to embodiments of the invention, oil quench tower 108 is further adapted to separate a mixture of cooled first intermediate product stream 21 and cooled second intermediate product stream 18' into (1) fuel stream 30 comprising primarily $C_{12}+$ hydrocarbons and (2) oil quench tower effluent stream 29. In embodiments of the invention, oil quench tower 108 utilizes $C_9+$ hydrocarbons as quench oil. In embodiments of the invention, an outlet of oil quench tower 108 may be in fluid communication with catalytic cracking unit 104 such that fuel stream 30 that is separated from cooled first intermediate product stream 21 and cooled second intermediate produce stream 18' flows to catalytic cracking unit 104 as fuel to provide heat for catalytic cracking unit 104.

In embodiments of the invention, a second outlet of oil quench tower 108 is in fluid communication with an inlet of water quench tower 109 such that oil quench tower effluent stream 29 flows from oil quench tower 108 to water quench tower 109. According to embodiments of the invention, water quench tower 109 is adapted to cool oil quench tower effluent stream 29 to form water quenched stream 31. In embodiments of the invention, water quenched stream 31 is at a temperature of 75 to 85° C. and all values and ranges there between including ranges of 75 to 76° C., 76 to 77° C., 77 to 78° C., 78 to 79° C., 79 to 80° C., 80 to 81° C., 81 to 82° C., 82 to 83° C., 83 to 84° C., and 84 to 85° C.

According to embodiments of the invention, an outlet of water quench tower 109 is in fluid communication with first compressor 110 such that water quenched stream 31 flows from water quench tower to first compressor 110. In embodiments of the invention, first compressor 110 is adapted to compress water quenched stream 31 to a pressure of 10 to 18 bar and all ranges and values there between. In embodiments of the invention, first compressor 110 is a two-stage compressor. First compressor 110 may be further adapted to separate water quenched stream 31 to $C_6+$ containing stream 32 and first compressed product stream 33. In embodiments of the invention, $C_6+$ containing stream 32 comprises BTX, $C_5$-$C_6$ hydrocarbons, $C_8+$ hydrocarbons, or combinations thereof. First compressed product stream 33 may comprise $C_1$-$C_4$ hydrocarbons, ethylene, propylene, hydrogen, or combinations thereof.

In embodiments of the invention, an outlet of first compressor 110 is in fluid communication with de-octanizer 111 such that $C_6+$ containing stream 32 flows from first compressor 110 to de-octanizer 111. In embodiments of the invention, de-octanizer 111 is adapted to separate $C_6+$ containing stream 32 into a plurality of streams including (1) $C_8+$ stream 35 comprising $C_8+$ hydrocarbons, which is subsequently recycled to distillation unit 101, (2) BTX stream 34 comprising primarily BTX, and (3) returning stream 36 flowing back to first compressor 110. Returning stream 36 may comprise $C_6$-$C_7$ hydrocarbons, $C_8$-$C_{11}$ hydrocarbons, or combinations thereof.

In embodiments of the invention, an outlet of de-octanizer 111 is in fluid communication with aromatics extraction unit 112 such that BTX stream 34 flows from de-octanizer 111 to aromatics extraction unit 112. In embodiments of the invention, aromatics extraction unit 112 is adapted to extract benzene, toluene, xylene from BTX stream 34 to produce (a) a BTX product stream comprising primarily benzene, toluene, and xylene, collectively and (b) stream 37 comprising non-BTX hydrocarbons. In embodiments of the invention, aromatics extraction unit 112 comprises one or more extraction columns, one or more distillation columns, one or more absorption columns, one or more adsorption columns, or combinations thereof. In embodiments of the invention, an inlet of distillation unit 101 is in fluid communication with aromatics extraction unit 112 such that heavy stream 37 flows from aromatics extraction unit 112 to distillation unit 101. In embodiments of the invention, heavy stream 37 may be combined with $C_6+$ stream 35 to form first recycle stream 53.

In embodiments of the invention, system 100 comprises first hydrogenation unit 128 configured to hydrogenate unsaturated hydrocarbons in first recycle stream 53 to produce hydrogenated first recycle stream 54. First hydrogenation unit 128 maybe in fluid communication with an inlet of distillation unit 101 such that hydrogenated first recycle stream 54 flows to distillation unit 101.

In embodiments of the invention, first compressed product stream 33 is subsequently flowed through water wash unit 113, first caustic tower 114, acid and oxygen removal unit 115, second caustic tower 116, second compressor 117 to form second compressed product stream 38. In embodiments of the invention, water wash unit 113 is adapted to remove water soluble components including oxygenates, alcohols, or combinations thereof. First caustic tower 114 may be adapted to remove CO from first compressed product stream 33. Acid and oxygen removal unit 115 may be adapted to remove acidic compounds and oxygen from first compressed product stream 33. In embodiments of the invention, acidic and oxygen removal unit 115 comprises a distillation unit, an absorption unit, an adsorption unit, or combinations thereof. Second caustic tower 116 may be adapted to further remove CO, methanol, oxygenates, or combinations thereof from first compressed product stream 33. Second compressor 117 may be adapted to further compress first compressed product stream 33 to a pressure of 30 to 40 bar and all ranges and values there between.

According to embodiments of the invention, second compressor 117 is in fluid communication with de-methanizer 118 such that second compressed product stream 38 flows from second compressor 117 to de-methanizer 118. De-methanizer 118 may be configured to remove methane and hydrogen from second compressed product stream 38 to form de-methanized stream 39, which flows from de-methanizer 118 to de-ethanizer 119. In embodiments of the invention, de-ethanizer 119 is configured to separate de-methanized stream 39 to $C_2$ stream 40 and de-ethanized stream 41. In embodiments of the invention, $C_2$ stream 40 is split in $C_2$ splitter 121 into ethylene stream 42 and ethane stream 43. In embodiments of the invention, ethylene stream comprises 98.5 to 99.5 wt. % ethylene.

In embodiments of the invention, de-ethanized stream 41 is flowed to de-propanizer 120, which is configured to separate de-ethanized stream 41 into $C_3$ stream 44 comprising propane and propylene, and de-propanized stream 45. According to embodiments of the invention, $C_3$ stream 44 is flowed through MAPD hydrogenation unit 122 to remove methyl acetylene and propadiene from $C_3$ stream 44 to form hydrogenated $C_3$ stream 46 comprising primarily propane and propylene. Hydrogenated $C_3$ stream 46 may be further split in $C_3$ splitter 123 into propylene stream 47 comprising 95 to 99.5 wt. % propylene and propane stream 48 comprising primarily propane.

According to embodiments of the invention, de-propanized stream 45 is flowed to de-butanizer 124 adapted to separate de-propanized stream 45 into (1) de-butanized stream 50 comprising $C_5$ hydrocarbons, $C_6$ hydrocarbons, or combinations thereof, and (2) $C_4$ stream 49 comprising n-butane, 1-butene, 2-butene, butadiene, isobutylene, isobutane, or combinations thereof.

In embodiments of the invention, $C_4$ stream 49 is flowed to second hydrogenation unit 125 adapted to hydrogenate 1-butene, 2-butene, butadiene, and/or isobutylene in $C_4$ stream 49 to form hydrogenated $C_4$ stream 52. In embodiments of the invention, an outlet of de-butanizer 124 is in fluid communication with an inlet of de-octanizer 111 such that de-butanized stream 50 flows from de-butanizer 124 to de-octanizer 111. According to embodiments of the invention, ethane stream 43, propane stream 48, and hydrogenated $C_4$ stream 52 are combined to form second recycle stream 51. According to embodiments of the invention, second recycle stream 51 is recycled to steam cracking unit 103.

In embodiments of the invention, each of de-methanizer 118, de-ethanizer 119, de-propanizer 120, de-butanizer 124, and de-hexanizer 111 may comprise one or more distillation columns, one or more absorption columns, one or more adsorption columns, or combinations thereof. In embodiments of the invention, each of $C_2$ splitter 121, and $C_3$ splitter 123 includes one or more distillation columns, one or more absorption columns, one or more adsorption columns, or combinations thereof.

B. Method of Producing Light Olefins and BTX

Figure 2:
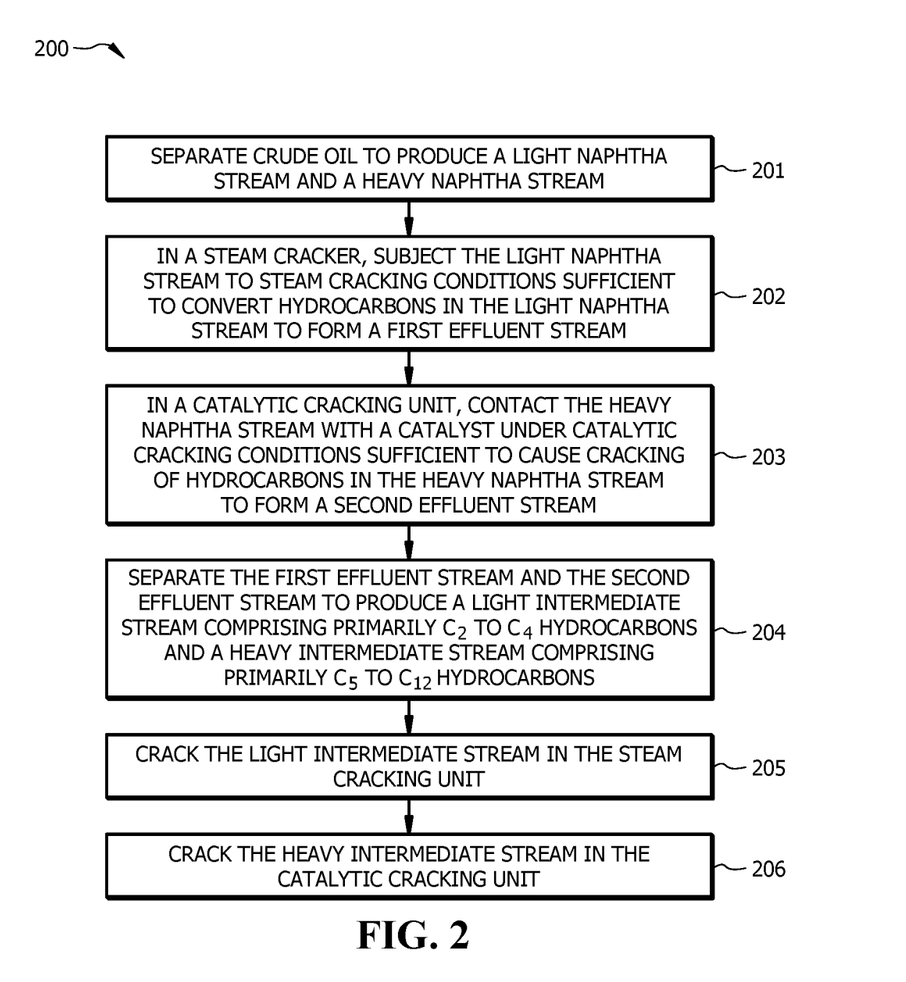
FIG. 2 shows a schematic flowchart of a method of producing light olefins and BTX, according to embodiments of the invention.

As shown in FIG. 2, embodiments of the invention include method 200 for producing light olefins and BTX. Method 200 may be implemented by system 100, as shown in FIG. 1. According to embodiments of the invention, method 200 comprises separating crude oil stream 11 to produce a light naphtha stream (second stream 13) and a heavy naphtha stream (first stream 12), as shown in block 201. In embodiments of the invention, the heavy naphtha stream (first stream 12) may comprise heavy naphtha that has an initial boiling point in a range of 85 to 95° C. and a final boiling point in a range of 200 to 250° C. The light naphtha stream (second stream 13) may comprise light naphtha that has an initial boiling point in a range of 25 to 35° C. and a final boiling point in a range of 85 to 95° C. In embodiments of the invention, separating at block 201 is performed in distillation unit 101. Distillation unit 101 may be operated at an overhead boiling range of 80 to 90° C. and a reboiler boiling range of 200 to 250° C. Distillation unit 101 may be operated at an operating pressure of 1.01 to 1.05 bar and all ranges and values there between including 1.02 bar, 1.03 bar, and 1.04 bar. In embodiments of the invention, the heavy naphtha stream (first stream 12) is preheated in feed preheating unit 102 to produce catalytic cracking feed stream 15.

According to embodiments of the invention, as shown in block 202, method 200 includes subjecting, in steam cracking unit 103, the light naphtha stream (second stream 13) to steam cracking conditions sufficient to convert hydrocarbons in second stream 13 to form a first effluent stream (second intermediate product stream 18). In embodiments of the invention, steam cracking conditions include a steam and hydrocarbon weight ratio of 0.2 to 0.7 and all ranges and values there between including ranges of 0.2 to 0.3, 0.3 to 0.4, 0.4 to 0.5, 0.5 to 0.6, and 0.6 to 0.7. In embodiments of the invention, steam cracking conditions include a reaction temperature of 800 to 900° C. and all ranges and values there between including 800 to 810° C., 810 to 820° C., 820 to 830° C., 830 to 840° C., 840 to 850° C., 850 to 860° C., 860 to 870° C., 870 to 880° C., 880 to 890° C., 890 to 900° C. Steam cracking conditions may include a residence time of 100 to 5000 ms and all ranges and values there between including ranges of 100 to 200 ms, 200 to 300 ms, 300 to 400 ms, 400 to 500 ms, 500 to 600 ms, 600 to 700 ms, 700 to 800 ms, 800 to 1000 ms, 1000 to 1500 ms, 1500 to 2000 ms, 2000 to 2500 ms, 2500 to 3000 ms, 3000 to 3500 ms, 3500 to 4000 ms, 4000 to 4500 ms, and 4500 to 5000 ms. According to embodiments of the invention, the first effluent stream (second intermediate product stream 18) comprises ethylene, ethane, propylene, propane, $C_4$ hydrocarbons (including n-butane, isobutane, 1-butene, 2-butene, isobutene, and butadiene), methane, hydrogen, $C_5$+ hydrocarbons, or combinations thereof. In embodiments of the invention, the $C_5$+ hydrocarbons include benzene, toluene, and xylene. In embodiments of the invention, the first effluent stream comprises 5 to 20 wt. % ethylene, 5 to 10 wt. % propylene, 1 to 5 wt. % $C_4$ hydrocarbons, 0.2 to 5 wt. % BTX, and 0.2 to 5 wt. % $C_5$+ hydrocarbons.

In embodiments of the invention, at block 202, superheated steam can be provided from second flue gas heat recovery unit 126. The first effluent stream (second intermediate product stream 18) may be cooled in second process heat recovery unit 127 to produce cooled second intermediate product stream 18'. Second process heat recovery unit 127 may use the first effluent stream (second intermediate product stream 18) as heat transfer medium to produce steam from boiler feed water.

According to embodiments of the invention, as shown in block 203, method 200 includes, in catalytic cracking unit 104, contacting the heavy naphtha stream (catalytic cracking feed stream 15) with a catalyst under catalytic cracking conditions sufficient to cause cracking of hydrocarbons in the preheated heavy naphtha stream to form a second effluent stream (first intermediate product stream 20). The preheated heavy naphtha stream (catalytic cracking feed stream 15) may have a dilute gas to hydrocarbon ratio of 0.5 to 2 and all ranges and values there between. The dilute gas may include steam, methane, nitrogen, ethane, propane, or combinations thereof. In embodiments of the invention, the catalyst comprises silica, alumina, zeolite, or combinations thereof. The catalytic cracking conditions may include a reaction temperature of 650 to 700° C. and all ranges and values there between including ranges of 650 to 655° C., 655 to 660° C., 660 to 665° C., 665 to 670° C., 670 to 675° C., 675 to 680° C., 680 to 685° C., 685 to 690° C., 690 to 695° C., 695 to 700° C. The catalytic cracking conditions may include a reaction pressure of 1.5 to 2.5 bar and all ranges and values there between including ranges of 1.5 to 1.6 bar, 1.6 to 1.7 bar, 1.7 to 1.8 bar, 1.8 to 1.9 bar, 1.9 to 2.0 bar, 2.0 to 2.1 bar, 2.1 to 2.2 bar, 2.2 to 2.3 bar, 2.3 to 2.4 bar, and 2.4 to 2.5 bar. The catalytic cracking conditions may include a residence time of 1 to 10 seconds and all ranges and values there between including ranges of 1 to 2 seconds, 2 to 3 seconds, 3 to 4 seconds, 4 to 5 seconds, 5 to 6 seconds, 6 to 7 seconds, 7 to 8 seconds, 8 to 9 seconds, and 9 to 10 seconds. In embodiments of the invention, the second effluent stream (first intermediate product stream 20) comprises ethylene, ethane, propylene, propane, $C_4$ hydrocarbons, methane, hydrogen, $C_5+$ hydrocarbons, or combinations thereof. In embodiments of the invention, the $C_5+$ hydrocarbons include benzene, toluene, and xylene. According to embodiments of the invention, the second effluent stream (first intermediate product stream 20) comprises 10 to 20 wt. % ethylene, 10 to 25 wt. % propylene, 5 to 15 wt. % $C_4$ hydrocarbons, 5 to 20 wt. % BTX, and 5 to 20 wt. % $C_5+$ hydrocarbons.

In embodiments of the invention, process heat of the second effluent stream (first intermediate product stream 20) is recovered in first process heat recovery unit 105 to produce steam stream 27 and cooled first intermediate product stream 21. In embodiments of the invention, cooled first intermediate product stream 21 is at a temperature of 200 to 300° C. and all ranges and values there between including ranges of 200 to 210° C., 210 to 220° C., 220 to 230° C., 230 to 240° C., 240 to 250° C., 250 to 260° C., 260 to 270° C., 270 to 280° C., 280 to 290° C., 290 to 300° C. In embodiments of the invention, both cooled first intermediate product stream 21 and second intermediate product stream 18 are flowed to oil quench tower 108.

In embodiments of the invention, oil quench tower effluent stream 29 is further quenched in water quench tower 109 to form water quenched stream 31. According to embodiments of the invention, as shown in block 204, method 200 further includes separating the first effluent stream and the second effluent stream to produce a light intermediate stream (second recycle stream 51) comprising primarily $C_2$ to $C_4$ hydrocarbons, and a heavy intermediate stream (hydrogenated first recycle stream 54) comprising primarily $C_5$ to $C_{12}$ hydrocarbons. In embodiments of the invention, the light intermediate stream comprises primarily ethane, propane, n-butane and isobutane, collectively. The heavy intermediate stream comprises primarily $C_5$ to $C_{12}$ hydrocarbons, which comprises substantially no BTX.

In embodiments of the invention, the separating at block 204 is carried out in a separation unit comprising one or more quench towers, one or more compressing units, one or more distillation columns, one or more extraction units, one or more caustic towers, one or more washing units, or combinations thereof. In embodiments of the invention, the separation unit used for separating at block 206 includes oil quench tower 108, water quench tower 109, first compressor 110, water wash unit 113, first caustic tower 114, acid and oxygen removal unit 115, second caustic tower 116, second compressor 117, de-methanizer 118, de-ethanizer 119, $C_2$ splitter 121, de-propanizer 120, MAPD hydrogenation unit 122, $C_3$ splitter 123, de-butanizer 124, second hydrogenation unit 125, dehexanizer 111, aromatics extraction unit 112, as shown in FIG. 1.

In embodiments of the invention, separating at block 204 includes cooling cooled first intermediate product stream 21 and second intermediate product stream 18 in oil quench tower 108 to produce oil quench tower effluent stream 29. In embodiments of the invention, oil quench tower effluent stream 29 is at a temperature of 95 to 150° C. and all ranges and values there between including ranges of 95 to 100° C., 100 to 105° C., 105 to 110° C., 110 to 115° C., 115 to 120° C., 120 to 125° C., 125 to 130° C., 130 to 135° C., 135 to 140° C., 140 to 145° C., and 145 to 150° C. In embodiments of the invention, oil quench tower 108 uses $C_9+$ hydrocarbons as quench oil. In embodiments of the invention, $C_{12}+$ hydrocarbons in cooled first intermediate product stream 21 and second intermediate product stream 18 is separated in oil quench tower 108 and recycled to catalytic cracking unit 104 as fuel.

According to embodiments of the invention, the separating at block 204 further includes compressing water quenched stream 31 in first compressor 110 to separate water quenched stream 31 into $C_6+$ containing stream 32 and first compressed product stream 33. $C_6+$ containing stream 32 may be further separated in de-octanizer 111 into (1) $C_6+$ stream 35 comprising non-BTX $C_6+$ hydrocarbons recycled to distillation unit 101, (2) BTX stream 34 comprising primarily BTX, and (3) returning stream 36 flowing back to first compressor 110. Returning stream 36 may comprise $C_2$-$C_5$ hydrocarbons, methane, hydrogen, or combinations thereof. BTX stream 34 may be separated in aromatic extraction unit 112 to produce a BTX product stream and heavy stream 37. Heavy stream may be combined with $C_6+$ stream 35 to produce first recycle stream 53. The separating at block 204 may further comprise treating first compressed product stream 33 in water wash unit 113, first caustic tower 114, acid and oxygen removal unit 115, second caustic tower 116, and second compressor 117 to produce second compressed product stream 38. Separating at block 204 may further comprise removing methane from second compressed product stream 38 to form de-methanized stream 39. De-methanized stream 39 may be separated in de-ethanizer 119 to produce $C_2$ stream 40 and de-ethanized stream 41. $C_2$ stream 40 may be further separated in $C_2$ splitter 121 to produce ethylene stream 42 and ethane stream 43. De-ethanized stream 41 may be separated in de-propanizer 120 into $C_3$ stream and de-propanized stream 45. $C_3$ stream may be further processed in MAPD hydrogenation unit 122 to remove methyl acetylene and propadiene. $C_3$ stream may be further separated in $C_3$ splitter to produce propylene stream 47 and propane stream 48. De-propanized stream 45 may be further separated in de-butanizer 124 to produce $C_4$ stream 49 and de-butanized stream 50 comprising $C_4+$ hydrocarbons. De-butanized stream 50 may be flowed to de-octanizer 111. $C_4$ stream 49 may include n-butane, isobutane, 1-butene, 2-butene, isobutene, butadiene, or combinations thereof. $C_4$ hydrocarbons in $C_4$ stream 49 may be further hydrogenated to produce hydrogenated $C_4$ stream 52. Ethane stream 43, propane stream 48 and hydrogenated $C_4$ stream 52 may be combined to form second recycle stream 51 (the light intermediate stream) comprising $C_2$ to $C_4$ paraffins.

According to embodiments of the invention, as shown in block 205, method 200 further includes cracking the light intermediate stream (second recycle stream 51) in steam cracking unit 103. According to embodiments of the invention, as shown in block 206, method 200 further includes cracking the heavy intermediate stream (hydrogenated first recycle stream 54) in catalytic cracking unit 104. In embodiments of the invention, cracking at block 206, may include flowing heavy intermediate stream (hydrogenated first recycle stream 54) to distillation unit 101.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

In the context of the present invention, at least the following 19 embodiments are described. Embodiment 1 is a method of producing light olefin and/or aromatic. The method includes separating a crude oil to produce a light naphtha stream that has an initial boiling point in a range of 25 to 35° C. and a final boiling point in a range of 85 to 95° C., and a heavy naphtha stream that has an initial boiling point in a range of 85 to 95° C. and a final boiling point in a range of 200 to 250° C. The method further includes, in a steam cracking unit, subjecting the light naphtha stream to steam cracking conditions sufficient to convert hydrocarbons in the light naphtha stream and produce a first effluent stream containing one or more of ethylene, propylene, butene, benzene, toluene, and xylene. The method also includes, in a catalytic cracking unit, contacting the heavy naphtha stream with a catalyst under catalytic cracking conditions sufficient to cause cracking of hydrocarbons in the heavy naphtha stream to form a second effluent stream. In addition, the method includes separating the first effluent stream and the second effluent stream to produce a light intermediate stream containing primarily $C_2$ to $C_4$ hydrocarbons, and a heavy intermediate stream containing primarily $C_5$ to $C_{12}$ hydrocarbons. The method still further includes cracking the light intermediate stream in the steam cracking unit, and cracking the heavy intermediate stream in the catalytic cracking unit. Embodiment 2 is the method of embodiment 1, wherein the crude oil is separated in a distillation column. Embodiment 3 is the method of either of embodiments 1 or 2, wherein the separating of the second effluent stream further produces an intermediate product stream containing one or more of ethylene, propylene, benzene, toluene, and xylene. Embodiment 4 is the method of any of embodiments 1 to 3, wherein the separating of the first effluent stream and the second effluent stream further produces a plurality of product streams including an ethylene stream containing primarily ethylene, a propylene stream containing primarily propylene, and a BTX stream containing primarily benzene, toluene, xylene, collectively. Embodiment 5 is the method of any of embodiments 1 to 4, wherein the heavy intermediate stream is hydrogenated before the step cracking in the catalytic cracking unit. Embodiment 6 is the method of any of embodiments 1 to 5, wherein the separating of the first effluent stream and the second effluent stream includes flowing the first effluent stream and the second effluent stream to an oil quench tower. The method further includes cooling the first effluent stream and the second effluent stream in the oil quench tower followed by a water quench tower to produce a quench tower effluent stream. The method still further includes separating the quench tower effluent stream in a de-octanizer to produce a BTX stream containing primarily benzene, toluene, xylene, collectively, the heavy intermediate stream containing primarily $C_5$ to $C_{12}$ hydrocarbons, and a $C_2$ to $C_4$ stream. The method also includes separating the $C_2$ to $C_4$ stream to form a plurality streams including the light intermediate stream, an ethylene stream containing primarily ethylene, a propylene stream containing primarily propylene. Embodiment 7 is the method of any of embodiments 1 to 6, wherein the light intermediate stream contains primarily ethane, propane, and $C_4$ hydrocarbons including n-butane, isobutane, butadiene, 1-butene, 2-butene, and isobutene. Embodiment 8 is the method of embodiment 7, wherein the $C_4$ hydrocarbons are hydrogenated before the light intermediate stream is cracked in the steam cracking unit. Embodiment 9 is the method of any of embodiments 1 to 8, wherein the catalytic cracking unit is operated at a temperature, within the catalytic cracking unit, of 650 to 700° C. Embodiment 10 is the method of any of embodiments 1 to 9, wherein the catalytic cracking unit is operated at a pressure, within the catalytic cracking unit, of 1.5 to 2.5 bar. Embodiment 11 is the method of any of embodiments 1 to 10, wherein the catalytic cracking unit is operated with a residence time of 1 to 10 seconds. Embodiment 12 is the method of any of embodiments 1 to 11, wherein the catalytic cracking unit includes a catalyst containing silica, alumina, zeolite, or combinations thereof. Embodiment 13 is the method of any of embodiments 1 to 12, wherein the steam cracking unit is operated at a temperature, within the steam cracking unit, of 800 to 900° C. Embodiment 14 is the method of any of embodiments 1 to 13, wherein the steam cracking unit is operated at a steam to hydrocarbon weight ratio of 0.2 to 0.7. Embodiment 15 is the method of any of embodiments 1 to 14, wherein the steam cracking unit is operated with a residence time of 100 to 5000 ms. Embodiment 16 is the method of any of embodiments 1 to 15, further including recovering process heat from the catalytic cracking unit and the steam cracking unit to produce superheated steam. Embodiment 17 is the method of embodiment 16, wherein the superheated steam is used to provide heat for the steam cracking unit. Embodiment 18 is the method of either of embodiments 16 or 17, wherein the superheated steam is used to pre-heat heavy naphtha before contacting with the catalyst. Embodiment 19 is the method of any of embodiments 16 to 18, wherein the superheated steam is used to pre-heat light naphtha before subjecting the light naphtha stream to steam cracking conditions.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of producing a light olefin and/or an aromatic, the method comprising:
    separating a crude oil to produce a light naphtha stream that has an initial boiling point in a range of 25 to 35° C. and a final boiling point in a range of 85 to 95° C., and a heavy naphtha stream that has an initial boiling point in a range of 85 to 95° C. and a final boiling point in a range of 200 to 250° C.;
    subjecting the light naphtha stream to steam cracking conditions in a steam cracking unit sufficient to convert hydrocarbons in the light naphtha stream and produce a first effluent stream comprising one or more of ethylene, propylene, butene, benzene, toluene, and xylene;
    contacting the heavy naphtha stream with a catalyst in a catalytic cracking unit under catalytic cracking conditions sufficient to cause cracking of hydrocarbons in the heavy naphtha stream to form a second effluent stream;
    separating the first effluent stream and the second effluent stream to produce a light intermediate stream comprising primarily $C_2$ to $C_4$ hydrocarbons, and a heavy intermediate stream comprising primarily $C_5$ to $C_{12}$ hydrocarbons;
    cracking the light intermediate stream in the steam cracking unit to produce the light olefin; and
    cracking the heavy intermediate stream in the catalytic cracking unit;
    wherein the steam cracking unit is operated at a temperature, within the steam cracking unit, of 800 to 900° C.;
    wherein the catalytic cracking unit is operated at a temperature, within the catalytic cracking unit, of 650 to 700° C. and a pressure, within the catalytic cracking unit, of 1.5 to 2.5 bar; and
    wherein the light intermediate stream comprises primarily ethane, propane, and $C_4$ hydrocarbons including butadiene, 1-butene, 2-butene, and isobutene;
    wherein the $C_4$ hydrocarbons are hydrogenated before the light intermediate stream is cracked in the steam cracking unit; and
    wherein the heavy intermediate stream is hydrogenated before the cracking step in the catalytic cracking unit.

2. The method of claim 1, wherein the crude oil is separated in a distillation column.

3. The method of claim 1, wherein the separating of the second effluent stream further produces an intermediate product stream comprising one or more of ethylene, propylene, benzene, toluene, and xylene.

4. The method of claim 1, wherein the separating of the first effluent stream and the second effluent stream further produces a plurality of product streams including an ethylene stream comprising primarily ethylene, a propylene stream comprising primarily propylene, and a BTX stream comprising primarily benzene, toluene, xylene, collectively.

5. The method of claim 1, wherein the separating of the first effluent stream and the second effluent stream comprises:
    flowing the first effluent stream and the second effluent stream to an oil quench tower;
    cooling the first effluent stream and the second effluent stream in the oil quench tower followed by a water quench tower to produce a quench tower effluent stream;
    separating the quench tower effluent stream in a de-octanizer to produce a BTX stream comprising primarily benzene, toluene, xylene, collectively, the heavy intermediate stream comprising primarily $C_5$ to $C_{12}$ hydrocarbons, and a $C_2$ to $C_4$ stream; and
    separating the $C_2$ to $C_4$ stream to form a plurality of streams including the light intermediate stream, an ethylene stream comprising primarily ethylene, a propylene stream comprising primarily propylene.

6. The method of claim 1, wherein the light intermediate stream further comprises primarily n-butane and isobutane.

7. The method of claim 1, wherein the catalytic cracking unit is operated at a pressure, within the catalytic cracking unit, of 1.5 to 2.5 bar.

8. The method of claim 1, wherein the catalytic cracking unit is operated with a residence time of 1 to 10 seconds.

9. The method of claim 1, wherein the catalytic cracking unit includes a catalyst comprising silica, alumina, zeolite, or combinations thereof.

10. The method of claim 1, wherein the steam cracking unit is operated at a temperature, within the steam cracking unit, of 900° C.

11. The method of claim 1, wherein the steam cracking unit is operated at a steam to hydrocarbon weight ratio of 0.2 to 0.7.

12. The method of claim 1, wherein the steam cracking unit is operated with a residence time of 100 to 5000 ms.

13. The method of claim 1, further comprising:
    recovering process heat from the catalytic cracking unit and the steam cracking unit to produce superheated steam.

14. The method of claim 13, wherein the superheated steam is used to provide heat for the steam cracking unit.

15. The method of claim 13, wherein the superheated steam is used to pre-heat heavy naphtha before contacting with the catalyst.

16. The method of claim 13, wherein the superheated steam is used to pre-heat light naphtha before subjecting the light naphtha stream to steam cracking conditions.

17. The method of claim 14, wherein the superheated steam is used to pre-heat light naphtha before subjecting the light naphtha stream to steam cracking conditions.

18. The method of claim 1, wherein the separating of the second effluent stream further produces an intermediate product stream comprising one or more of ethylene and propylene.

19. The method of claim 1, wherein the separating of the second effluent stream further produces an intermediate product stream comprising one or more of benzene, toluene, and xylene.

20. The method of claim 1, wherein the separating of the second effluent stream further produces an intermediate product stream comprising ethylene, propylene, benzene, toluene, and xylene.

* * * * *